(12) United States Patent
Thulin

(10) Patent No.: US 7,717,477 B1
(45) Date of Patent: May 18, 2010

(54) SWIVEL

(75) Inventor: Mats Thulin, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 09/959,584

(22) PCT Filed: May 11, 2000

(86) PCT No.: PCT/SE00/00944

§ 371 (c)(1),
(2), (4) Date: Dec. 12, 2001

(87) PCT Pub. No.: WO00/69600

PCT Pub. Date: Nov. 23, 2000

(30) Foreign Application Priority Data

May 12, 1999 (SE) .................................. 9901759

(51) Int. Cl.
*F16L 27/00* (2006.01)

(52) U.S. Cl. .................................. 285/272; 285/121.5

(58) Field of Classification Search ............. 285/121.5, 285/121.6, 121.1, 120.1, 127.1, 148.4, 272, 285/275, 98, 190, 148.1, 272.1; 137/580; 95/35, 267–270; 96/37.6; 55/406–409
See application file for complete search history.

(56) References Cited

U.S. PATENT DOCUMENTS

| | | | | |
|---|---|---|---|---|
| 1,617,776 A | * | 2/1927 | Taylor | .......................... 285/107 |
| 2,313,322 A | * | 3/1943 | Carpenter | ................ 285/121.5 |
| 2,586,991 A | * | 2/1952 | Postel | .......................... 285/272 |
| 2,779,435 A | * | 1/1957 | Hoeltje | .......................... 55/409 |
| 2,872,217 A | * | 2/1959 | May | .............................. 285/45 |
| 3,002,769 A | * | 10/1961 | Deubler et al. | ................. 285/39 |
| 3,411,526 A | * | 11/1968 | Schaefer | ...................... 285/190 |
| 3,774,376 A | * | 11/1973 | Takashima et al. | ............ 55/407 |
| 4,358,300 A | | 11/1982 | Schlapman et al. | |
| 4,557,514 A | | 12/1985 | Cushman et al. | |
| 4,887,351 A | | 12/1989 | Porterfield et al. | |
| 4,928,997 A | * | 5/1990 | Reisener et al. | ................ 285/13 |
| 4,936,059 A | | 6/1990 | Hashish et al. | |
| 5,044,673 A | * | 9/1991 | Jones, Jr. | ................... 285/121.3 |
| 5,236,479 A | | 8/1993 | Billingsley | |
| 5,344,202 A | | 9/1994 | Ramler et al. | |
| 5,348,352 A | * | 9/1994 | Ciez et al. | ................. 285/121.3 |
| 5,778,971 A | * | 7/1998 | Szam | .......................... 137/340 |
| 5,895,077 A | | 4/1999 | Sigmundstad | |
| 6,070,917 A | * | 6/2000 | Wiebe | .......................... 285/272 |
| 6,086,112 A | * | 7/2000 | Schofield et al. | .............. 285/98 |
| 6,105,605 A | * | 8/2000 | Helm et al. | ............. 137/355.19 |
| 6,224,063 B1 | * | 5/2001 | Faass | .......................... 277/371 |

FOREIGN PATENT DOCUMENTS

JP 4-063379 5/1992
WO WO 98/02906 A1 1/1998

* cited by examiner

*Primary Examiner*—Aaron M Dunwoody
(74) *Attorney, Agent, or Firm*—Venable LLP; Eric J. Franklin

(57) ABSTRACT

A manipulator operative in hygienic environments. A swivel operative to flexibly transport gas includes a fixed part comprising a plurality of members divisible to permit the swivel to be cleaned, a moveable part journaled in the fixed part, and a cavity arranged between the fixed part and the moveable part, the cavity operative to decrease a speed of gas flow whereby particles present in the gas are stopped and deposited in the cavity.

6 Claims, 1 Drawing Sheet

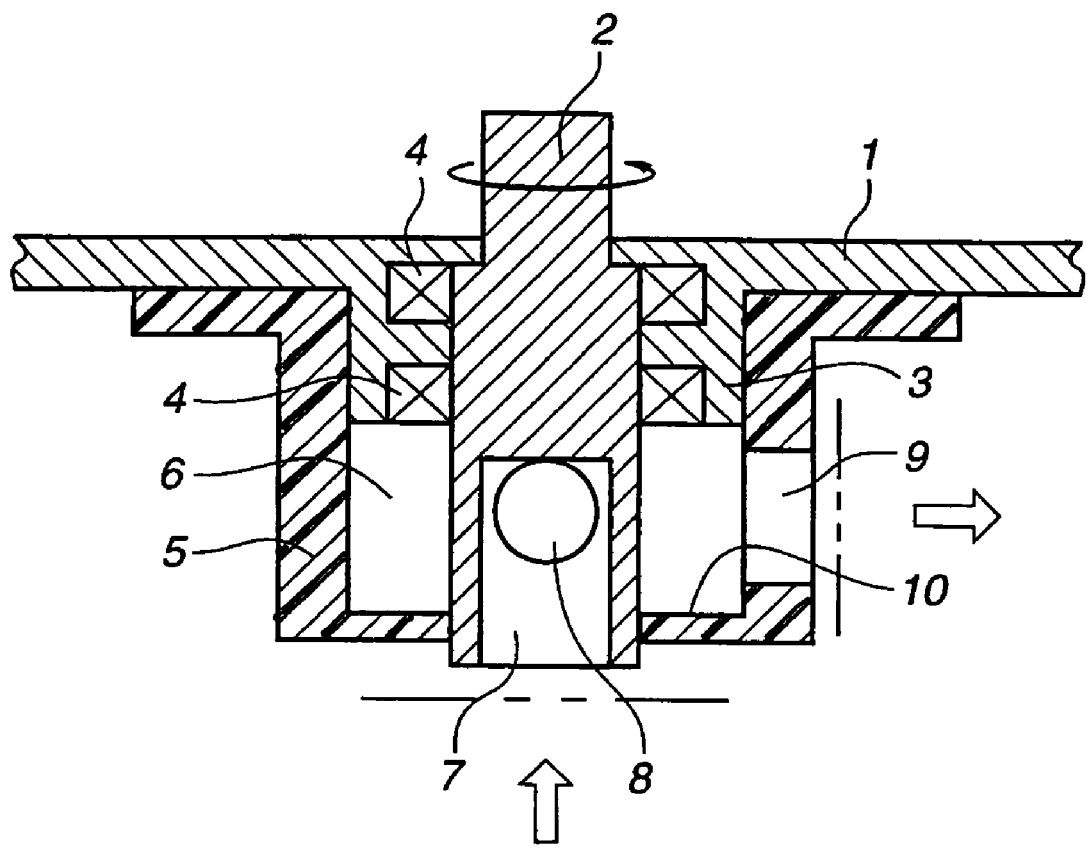

SWIVEL

TECHNICAL FIELD

The present invention relates to a swivel for flexible transport of a fluid. A swivel is a mechanical coupling comprising two parts which are rotatable relative to each other. More precisely, the invention relates to a swivel of a manipulator intended for the food industry. More particularly, the invention relates to a swivel for flexible transport of a gas between a fixed part and a part which rotates around the fixed part.

BACKGROUND ART

Swivels for transport of fluids are used in several connections. The simplest and most frequently used swivels occur, for example, in applications in vacuum cleaners. According to U.S. Pat. No. 4,936,059, a swivel is previously known, the task of which is to introduce particles into a swivel, which particles may be used in a jet beam for cutting purposes. According to U.S. Pat. No. 5,895,077, a swivel is previously known for use in offshore applications. The object of the known swivel is to serve as a coupling which can be divided into two parts in a fast an simple way, while at the same time offering an efficient and reliable seal between the parts. To this end, the known swivel is composed of a female part and a male part, which are rotatably arranged inside each other. The two parts adjoin each other along a substantially cylindrical cut surface. Both parts are arranged with inner channels for flowing fluids and have annular slots in the surfaces facing each other. Between these slots, the male part is provided with sealing rings which are operated by hydraulic means.

The known swivels constitute relatively complicated designs with a plurality of parts which must be made with high precision. The known swivels are also relatively heavy.

SUMMARY OF THE INVENTION

The object of the invention is to suggest ways and means of manufacturing a swivel which is light, has a simple construction and which is easily detachable for cleaning. The swivel according to the invention is adapted to transport a gas in a vacuum system where a suction cup is adapted to cause objects to adhere thereto.

The object is achieved according to the invention by a swivel and by a method according to the characteristic features described herein. Advantageous embodiments are described herein.

In picking operations in the food industry, it is suitable to grip objects by means of a suction cup. When the suction cup is applied on a shaft for orientation of the object, this is exceedingly suitable. To transmit the suction force, that is, transport gas such that underpressure arises, it is suitable in these contexts to make use of a swivel. Such a swivel may be made simple, that is, it may be made from only a small number of parts. Since it is intended to be placed on a manipulator, it is essential that it incurs a very small increase in weight. This requirement is fulfilled according to the invention in that the swivel is made of light materials, such as plastic or light metal.

An indispensible requirement in the food industry is good hygiene. The devices which operate in such environments must not leave or collect any dirt which may give rise to any colonies of bacteria. It is thus important that these devices can be washed or flushed in a simple manner without the function of the device being jeopardized.

Certain products which are picked in such hygienic environments leave residual particles. It may, for example, be brittle cookies which, during picking, leave crumbs. These residual particles then easily end up on the inside of the swivel and may there give rise to colonies of bacteria. For this reason, according to the invention, the swivel is divisible such that it may be easily detached and that the interior of the swivel may be flushed clean.

To obtain particles from an air flow, it is known to temporarily reduce the speed of the air flow. This is done by intermittently widening the cut section of the channel surrounding the gas flow. This causes the speed to drop and the particles to fall by the force of gravity from the flow. It is therefore suitable to arrange special pockets where these particles are collected and from where they may be subsequently cleared away.

The swivel is arranged with a part which is fixed to the manipulator and a movable part which is journalled in the fixed part. The fixed part comprises a plate with a detachable cup. Between the plate and the cup a cavity is formed. Journalled in the plate and extending through both the plate and the cup, a rotating rotor arm is arranged which forms the movable part. The robot arm comprises a suction cup which is in contact with the cavity via a first channel. The cup comprises a connection to a second channel which is connected to a device sucking air from the cavity. In this way, the cavity forms a hollow where the air speed is reduced. Particles accompanying the air flow then also lose speed and are instead influenced by the force of gravity. Thus, if particles accompany the air flow, they end up on the inside of the cup. This is adapted to be easily removed, enabling the inside of the swivel to be flushed clean.

BRIEF DESCRIPTION OF THE DRAWING

The invention will be explained in greater detail by description of an embodiment with reference to the accompanying drawing which shows a section of a swivel according to the invention.

DESCRIPTION OF THE PREFERRED EMBODIMENT

The swivel schematically shown in the FIGURE comprises, in the example, a fixed plate 1 which is attached to a manipulator (not shown). The plate comprises a hub 3, in which an arm 2 associated with the manipulator is rotatably journalled. In the example shown, the arm is journalled by two bearings 4. One end of the arm is connected to a drive system (not shown) of the manipulator. The other end is connected to a suction cup (not shown) for picking objects. The material in the plate as well as in the arm suitably consists of a metal, usually light metal.

Around the hub 3 and surrounding part of the arm 2, a cup 5 is arranged, which between itself and the arm encloses a hollow, a cavity 6. The arm penetrates the bottom 10 of the cup. To obtain good sealing in this portion, the cup is arranged with a seal which allows the arm to rotate. The cup is connected to the hub by means of an easily detachable joint. In one embodiment, the joint may consist of a thread, arranged internally of the cup, which fits into an external thread of the hub. In another embodiment, the cup is made of an elastic material and adapted to be fitted over the hub with its open part. Good sealing is obtained solely by the elastic pressure exerted by the cup against the hub. One or more grooves may also be arranged in one of the bodies, for example the hub, whereby corresponding flanged portions of the other body are adapted to fit thereinto.

The arm 2 comprises a first channel 7, which communicates with the cavity 6 by means of an opening 8. The cup 5 is connected, via a second channel 9, to a suction device (not shown) of the manipulator. Two arrows in the FIGURE denote the air flow when creating underpressure in the suction cup. Thus, air flows first through the first channel 7 and opens out into the cavity 6 via the opening 8. From the cavity, the air flows out through the second channel 9. When the air flows through the opening 8, the area of the channel is widened intermittently, whereby the air speed is reduced. Particles which accompany the air flow then stop and fall downwards under the influence of the force of gravity. In the FIGURE, these particles fall to the bottom 10 of the cup. The separated particles are then cleaned away from the cup by detaching the cup. When the cup has been detached, also the inner parts of the swivel may be flushed off.

Within the scope of the invention, also other embodiment of the swivel are feasible. Thus, the sought cavity may be arranged in other ways as well. For example, the cup may be attached to the rotatable arm and be journalled against the fixed part.

The invention claimed is:

1. A manipulator operative in hygienic environments, comprising:
    a swivel operative to flexibly transport gas and comprising
        a fixed part comprising
            a horizontally oriented plate and
            a vertically oriented upwardly opening cup having an opening detachably connected to the plate, a bottom opposite the opening, a side wall, and an exit passage extending through the sidewall,
            wherein the plate and the cup are divisible to permit the swivel to be cleaned;
        a rotatable vertically arranged moveable part journaled in the plate and including a closed first end extending up through the plate and an open second end extending down through the bottom of the cup, the movable part being rotatable with respect to the plate and the cup, the moveable part including a channel extending from the open second end into the moveable part and laterally facing opening in a side of the moveable part; and
        a cavity defined by the plate, the bottom of the cup, and side wall of the cup and the moveable part, the cavity being operative to decrease a speed of gas and particles present in the gas flowing up through the channel of the moveable part into the cavity, the moveable part and the cup being arranged such that the particles present in the gas are deposited on the bottom of the cup under the influence of gravity and the gas exits through the exit passage of the cup.

2. The manipulator according to claim 1, wherein the cup is plastic.

3. A swivel operative to flexibly transport gas in a manipulator in hygienic environments, comprising:
    a fixed part comprising a horizontally oriented plate and a vertically oriented upwardly opening cup having an opening detachably connected to the plate, a bottom opposite the opening, a side wall, and an exit passage extending through the sidewall, wherein the plate and the cup are divisible to permit the swivel to be cleaned;
    a rotatable vertically arranged moveable part journaled in the plate and including a closed first end extending up through the plate and an open second end extending down through the bottom of the cup, the movable part being rotatable with respect to the plate and the cup, the moveable part including a channel extending from the open second end into the moveable part and a laterally facing opening in a side of the moveable part; and
    a cavity defined by the plate, the bottom of the cup and side wall of the cup and the moveable part, the cavity being operative to decrease a speed of gas and particles present in the gas flowing up through the channel of the moveable part into the cavity, the moveable part and the cup being arranged such that the particles present in the gas are deposited on the bottom of the cup under the influence of gravity and the gas exits through the exit passage of the cup.

4. The swivel according to claim 3, wherein the cup is plastic.

5. A method for operating in hygienic environments a manipulator comprising a swivel for flexible transport of a gas flow, the method comprising:
    providing a swivel operative to flexibly transport gas and comprising a fixed part comprising a horizontally oriented plate and a vertically oriented upwardly opening cup having an opening detachably connected to the plate, a bottom opposite the opening, a side wall, and an exit passage extending through the sidewall, wherein the plate and the cup are divisible to permit the swivel to be cleaned; a rotatable vertically arranged moveable part journaled in the plate and including a closed first end extending up through the plate and an open second end extending down through the bottom of the cup, the movable part being rotatable with respect to the plate and the cup, the moveable part including a channel extending from the open second end into the moveable part and a laterally facing opening in a side of the moveable part; and a cavity defined by the plate, the bottom of the cup and side wall of the cup and the moveable part, the cavity being operative to decrease a speed of gas and particles present in the gas flowing up through the channel of the moveable part into the cavity, the moveable part and the cup being arranged such that the particles present in the gas are deposited on the bottom of the cup under the influence of gravity and the gas exits through the exit passage of the cup;
    directing gas flow from a moveable part of the swivel through a cavity to a fixed part of the swivel and
    arranging the swivel to be divisible allowing an inside of the swivel to be cleaned and flushed.

6. A manipulator operative in hygienic environments, comprising:
    a swivel operative to flexibly transport gas and comprising
    a fixed part comprising a horizontally oriented plate;
    a moveable part comprising
        a vertically oriented upwardly opening cup journalled against the plate and comprising a bottom opposite the opening, a side wall, and an exit passage extending through the side wall,
        a rotatable vertically arranged moveable part journaled in the plate and including a closed first end extending up through the plate and an open second end extending down through the bottom of the cup, the movable part being rotatable with respect to the plate and the cup, the moveable part including a channel extending from the open second end into the moveable part and a laterally facing opening in a side of the moveable part, the cup being detachably connected to the moveable part; and
    a cavity defined by the plate, the bottom of the cup and side wall of the cup and the moveable part, wherein the cavity is operative to decrease a speed of gas and particles present in gas introduced into and flowing up through the channel of the moveable part into the cavity, the moveable part and the cup being arranged such that the particles present in the gas are deposited on the bottom of the cup under the influence of gravity and the gas exits through the exit passage of the cup.

* * * * *